United States Patent
Jung

(10) Patent No.: US 9,866,095 B2
(45) Date of Patent: Jan. 9, 2018

(54) END-RING FOR INDUCTION MOTOR, ROTOR HAVING THE SAME

(71) Applicant: HYUNDAI MOBIS CO., LTD., Seoul (KR)

(72) Inventor: Daesung Jung, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 552 days.

(21) Appl. No.: 14/508,875

(22) Filed: Oct. 7, 2014

(65) Prior Publication Data

US 2015/0102698 A1    Apr. 16, 2015

(30) Foreign Application Priority Data

Oct. 15, 2013 (KR) .................. 10-2013-0122482

(51) Int. Cl.
*H02K 17/16* (2006.01)
(52) U.S. Cl.
CPC ................. *H02K 17/165* (2013.01)
(58) Field of Classification Search
CPC .... H02K 17/165; H02K 17/16; H02K 17/185; H05K 17/18
USPC ........... 310/211, 261.1, 156.78, 156.34, 179; 29/598
See application file for complete search history.

(56) References Cited

U.S. PATENT DOCUMENTS

| 1,523,388 A * | 1/1925 | Barr ................... H02K 15/0012 310/211 |
| 2,245,577 A * | 6/1941 | Dieckman ............. H02K 16/02 310/211 |
| 2,789,239 A * | 4/1957 | Thames, Jr. ............. H02K 3/20 310/183 |
| 3,662,195 A * | 5/1972 | Wielt ..................... H02K 17/16 310/211 |
| 3,996,485 A * | 12/1976 | Jaeschke .............. H02K 49/043 310/103 |
| 4,064,410 A * | 12/1977 | Roach ................ H02K 15/0012 310/211 |
| 5,642,010 A * | 6/1997 | Carosa ................. H02K 17/185 29/598 |
| 5,955,811 A * | 9/1999 | Chiba ................. F16C 32/0459 310/114 |
| 8,484,828 B2 * | 7/2013 | Kleber ............... H02K 15/0012 29/596 |
| 8,572,837 B2 * | 11/2013 | Lyons ................ H02K 15/0081 29/596 |

(Continued)

FOREIGN PATENT DOCUMENTS

| KR | 20-0243456 Y1 | 10/2001 |
| KR | 10-2009-0007050 A | 1/2009 |
| KR | 10-2010-0087865 A | 8/2010 |

*Primary Examiner* — Bernard Rojas
*Assistant Examiner* — Ahmed Elnakib
(74) *Attorney, Agent, or Firm* — Knobbe Martens Olson & Bear LLP

(57) ABSTRACT

A rotor comprises a rotor core comprising a rotational axis and a plurality of slots, a plurality of rotor bars inserted in the plurality of slots, and a plurality of holders arranged around a rotational axis of the rotor. Each holder comprises an insertion groove configured to receive and engage with an end of one of the plurality of rotor bars. An end of another rotor bar among the plurality of rotor bars is interposed between and coupled to two immediately neighboring holders among the plurality of holders.

8 Claims, 7 Drawing Sheets

(56) References Cited

U.S. PATENT DOCUMENTS

| | | | |
|---|---|---|---|
| 9,520,762 B2* | 12/2016 | Guercioni | H02K 15/0031 |
| 2002/0117991 A1* | 8/2002 | Burse | H02K 1/32 |
| | | | 318/798 |
| 2013/0043760 A1* | 2/2013 | Osborne | H02K 17/165 |
| | | | 310/211 |
| 2013/0127292 A1* | 5/2013 | Gieras | H02K 17/205 |
| | | | 310/211 |
| 2016/0141944 A1* | 5/2016 | Berger | H02K 17/165 |
| | | | 310/211 |

* cited by examiner

END-RING FOR INDUCTION MOTOR, ROTOR HAVING THE SAME

CROSS-REFERENCE TO RELATED APPLICATION

This application claims the benefit of priority to Korean Patent Application No. 10-2013-0122482 filed on Oct. 15, 2013, the entire contents of which are incorporated herein by reference.

TECHNICAL FIELD

The present disclosure relates to an end-ring for an induction motor and a rotor with the end-ring, and particularly, to a structure of an end-ring coupled with rotor bars of a rotor of an induction motor.

BACKGROUND

A rotor of an induction motor is configured of an electrical sheet, a rotor bar, and end-ring. In the case of a typical induction machine, since the rotor bar and the end-ring are made of an aluminum material, the rotor bar and the end-ring are simultaneously manufactured to integrate the rotor bar and the end-ring by aluminum die casting. Recently, in order to improve efficiency of an induction motor, it is inclined to use copper having low resistivity instead of using aluminum.

However, in the case of using copper instead of aluminum, it is very difficult to manufacture the induction motor by copper (Cu) die casting. The reason is that a boiling point of aluminum is 700° C. but a boiling point of copper is 1300° C. In the case of manufacturing the induction motor by the copper die casting, an expensive die casting equipment is required and since a manufacturing technology of only the copper die casting is required, a domestic/foreign place which may manufacture the induction motor is very restricted.

For this reason, the copper rotor bar has been typically used. In this case, after the copper rotor bar fitted for a shape of the electrical sheet is manufactured and is inserted into the electrical sheet, upper and lower copper rotor bars and the end-ring portion are coupled with each other by brazing.

SUMMARY

An aspect of the present inventive concept relates to an end-ring for an induction motor configuring a rotor without using an expensive star-like end-ring and a rotor having the same.

Another aspect of the present inventive concept is directed to an end-ring for an induction motor capable of improving mass production of the induction motor having a copper rotor bar even though the end-ring of a copper piece type is applied and a rotor having the same.

Other objects and advantages of the present inventive concept can be understood by the following description, and become apparent with reference to the embodiments of the present inventive concept. Also, it is obvious to those skilled in the art to which the present inventive concept pertains that the objects and advantages of the present inventive concept can be realized by the means as claimed and combinations thereof.

In accordance with an aspect of the present inventive concept, an end-ring for an induction motor, wherein the end-ring has an outside provided with an insertion groove and is configured of a plurality of separate pieces.

A material of the plurality of pieces may be copper (Cu).

A material of the plurality of pieces may be aluminum (Al).

The plurality of pieces may have a "⊏"-shape.

The plurality of pieces may be configured of 34.

In accordance with an aspect of the present inventive concept, a rotor includes: a pair of end-rings for an induction motor; a plurality of rotor bars configured to be coupled with insertion grooves of the plurality of pieces; and a rotor core configured to be coupled with the plurality of rotor bars.

A material of the rotor bar may be copper (Cu).

A material of the rotor bar may be aluminum (Al).

The insertion grooves formed in the plurality of pieces may be coupled between the rotor bars from an inside direction of the rotor toward an outside direction.

The end-ring and the plurality of rotor bars may be bonded to each other by brazing.

An area width of the end-ring for an induction motor may be a sum of a width of the rotor bar with an inside width of the plurality of pieces.

The plurality of pieces may have a "⊏"-shape.

The plurality of pieces may be configured of 34.

DETAILED DESCRIPTION

Figure 1A:
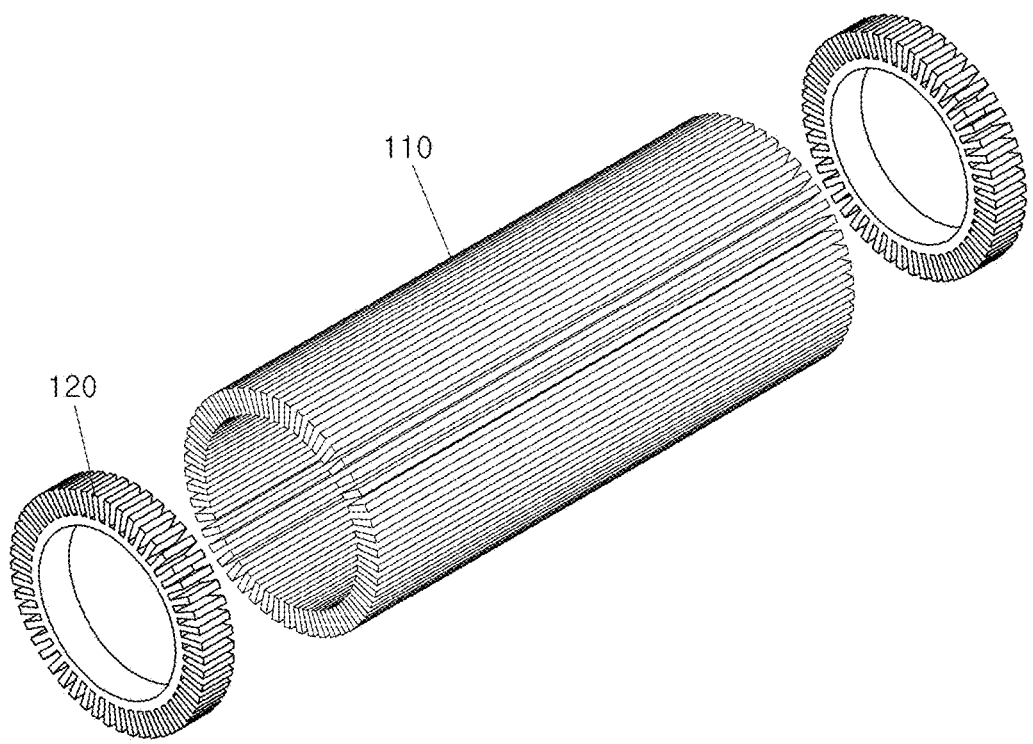
FIGS. 1A-1C are diagrams illustrating a coupling structure of a rotor bar using a star-like end-ring with the end-ring.

Since the present inventive concept may be variously modified and have several embodiments, specific embodiments will be shown in the accompanying drawings and be described in detail in a detailed description. However, it is to be understood that the present inventive concept is not limited to the specific embodiments, but includes all modifications, equivalents, and substitutions included in the spirit and the scope of the present inventive concept.

Throughout the accompanying drawings, the same reference numerals will be used to describe the same components.

Terms used in the specification, 'first', 'second', etc., may be used to describe various components, but the components are not to be construed as being limited to the terms. That is, the terms are used to distinguish one component from another component.

For example, the 'first' component may be named the 'second' component and the 'second' component may also be similarly named the 'first' component, without departing from the scope of the present inventive concept. The term 'and/or' includes a combination of a plurality of items or any one of a plurality of terms.

Unless indicated otherwise, it is to be understood that all the terms used in the specification including technical and scientific terms have the same meaning as those that are understood by those who skilled in the art.

It must be understood that the terms defined by the dictionary are identical with the meanings within the context of the related art, and they should not be ideally or excessively formally defined unless the context clearly dictates otherwise.

Hereinafter, an end-ring for an induction motor and a rotor having the same in accordance with an embodiment of the present inventive concept will be described in detail with reference to the accompanying drawings.

Generally, coupling the end-ring with the copper rotor bar by making the end-ring shape an annular (donut) shape is the simplest method. However, in the case of a driving motor for a green car, since the driving motor is a motor driven at a high speed, the end-ring may be separated from the copper rotor bar at a high speed when the annular end-ring is applied. Due to the problem, a method of manufacturing the end-ring in a star type fitted for the shape of the copper rotor bar and coupling the end-ring with the copper rotor bar has been mainly used.

Figure 1B:
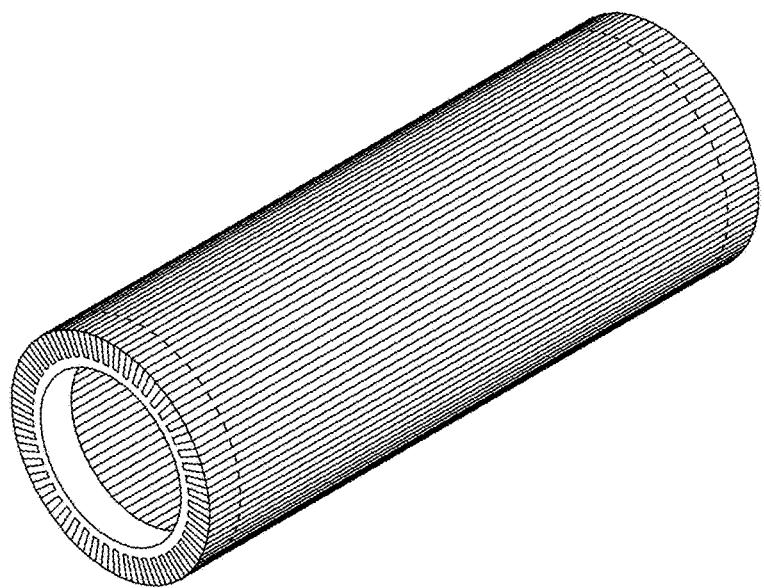
Figure 1C:
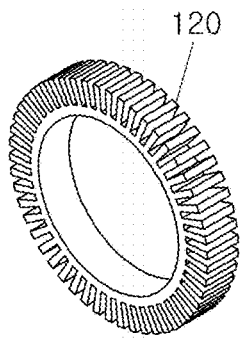

This is shown in FIGS. 1A-1C. Referring to FIG. 1A, a copper rotor bar 110 is inserted, and star-like end-rings 120 are inserted into upper and lower portions of the copper rotor bar 110 and then the end-rings 120 are coupled with the copper rotor bar 110 by brazing. The coupling structure is shown in FIG. 1B.

FIG. 1C illustrates a structure of the star-like end-ring 120. To manufacture the end-ring shape in the star type, since the end-ring is manufactured by wire cutting, additional time and costs are required.

In other words, the structure is to prevent the end-ring from separating from the copper rotor bar at the time of high speed driving, but since the star-like end-ring needs to be wire cut, processing cost is expensive and much processing time is required. That is, mass production may be reduced.

Further, there is a method of forming the end-ring by collecting squared copper pieces as another end-ring structure. In other words, as a method of inserting a plurality of squared copper pieces between the respective copper rotor bars, there is a method of coupling an end-ring with a copper rotor bar.

However, in the end-ring structure, since the plurality of copper pieces are inserted between the copper rotor bars one by one, manufacturing time may be long and an area of the end-ring may be reduced. Further, a copper loss may be increased due to the reduction in the area of the end-ring.

Generally, in other words, a current flowing in several copper rotor bars flows in other copper rotor bars through the end-ring and therefore the area of the end-ring between the cooper rotor bars needs to be larger than that of the copper rotor bar. However, in the case of using the copper pieces, since the area of the copper rotor bar is the same as the area of the end-ring, a larger amount of heat may be generated in the end-ring than in the copper rotor bar and the efficiency may be reduced.

Further, after the brazing, there is a need to process both of the inside of the end-ring part and the outside of the rotor.

Further, when the copper rotor bar is applied, since a density of copper is 3.3 times as large as that of aluminum, the number of copper rotor bars is increased to secure a safety factor of the rotor. Therefore, when the number of copper rotor bars is 68, since the copper pieces are required at both of the upper and lower portions of the rotor, 136 copper pieces are required, but since a person inserts the 136 copper pieces between the copper rotor bars, a great deal of time may be required and there are many problems in manufacturing ability.

Figure 2:
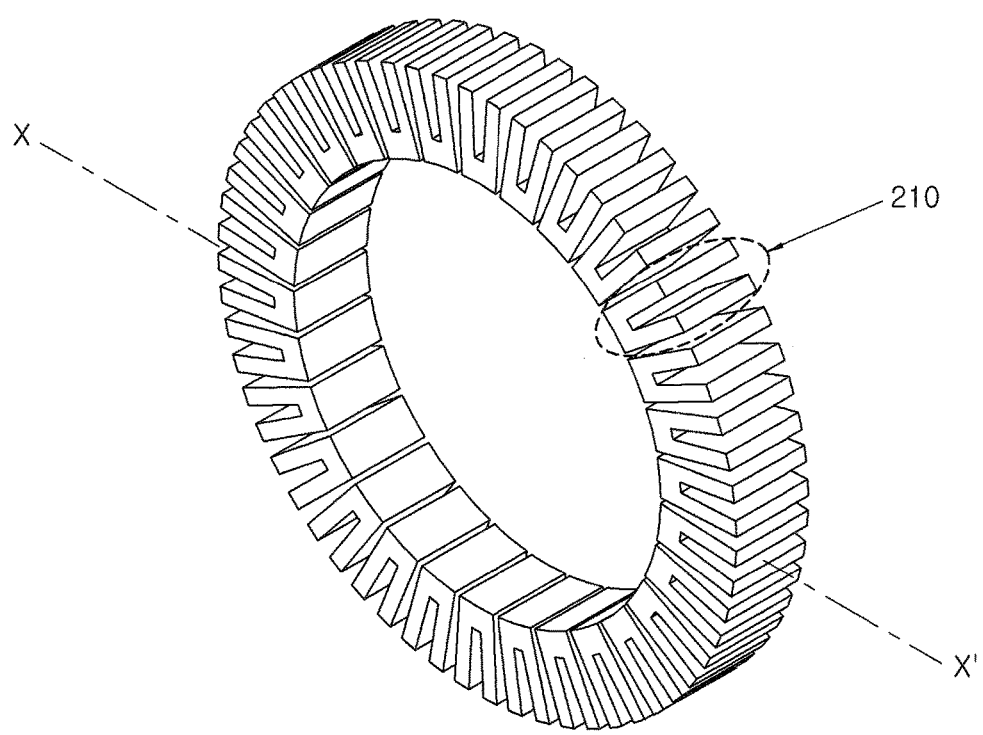
FIG. 2 is a perspective view of the end-ring in accordance with an embodiment of the present inventive concept.

FIG. 2 is a perspective view of an end-ring in accordance with an embodiment of the present inventive concept. Referring to FIG. 2, the end-ring 200 is formed by collecting a plurality of pieces 210. Further, the plurality of pieces 210 are not connected to each other, but are independently separated from each other. Further, an assembled shape of the number of pieces 210 becomes a circle. Further, a material of the plurality of pieces 210 may be copper (Cu) but is not limited thereto, and therefore aluminum (Al) may be used. The plurality of pieces 210 are configured of 34. Therefore, when the end-ring is formed at both sides, the number of pieces 210 becomes a total of 64. Therefore, the number of pieces is more reduced than the existing 136 pieces.

Figure 3:
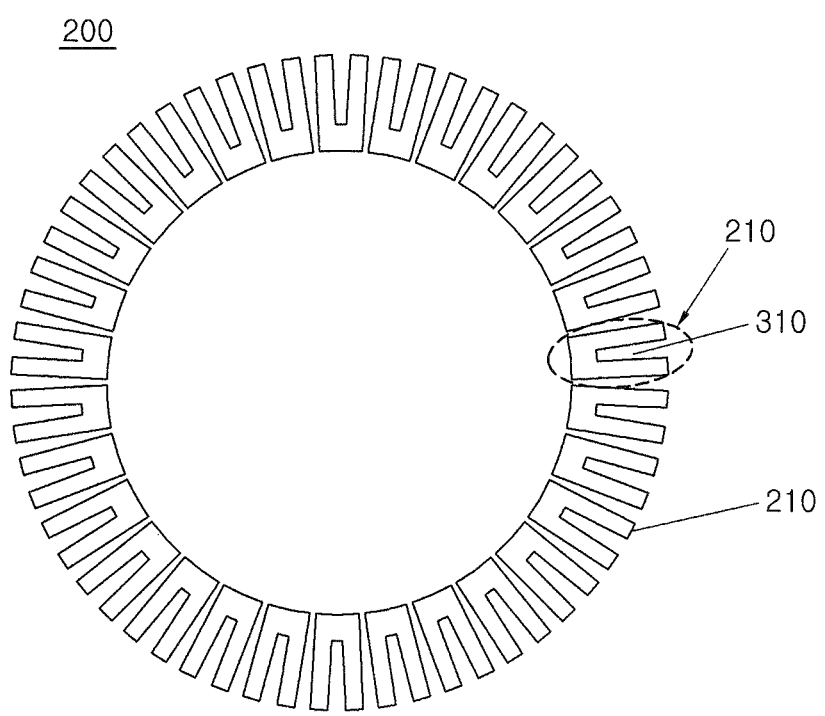
FIG. 3 is a cross-sectional view taken along an X-X' axis illustrated in FIG. 2.
Figure 5:
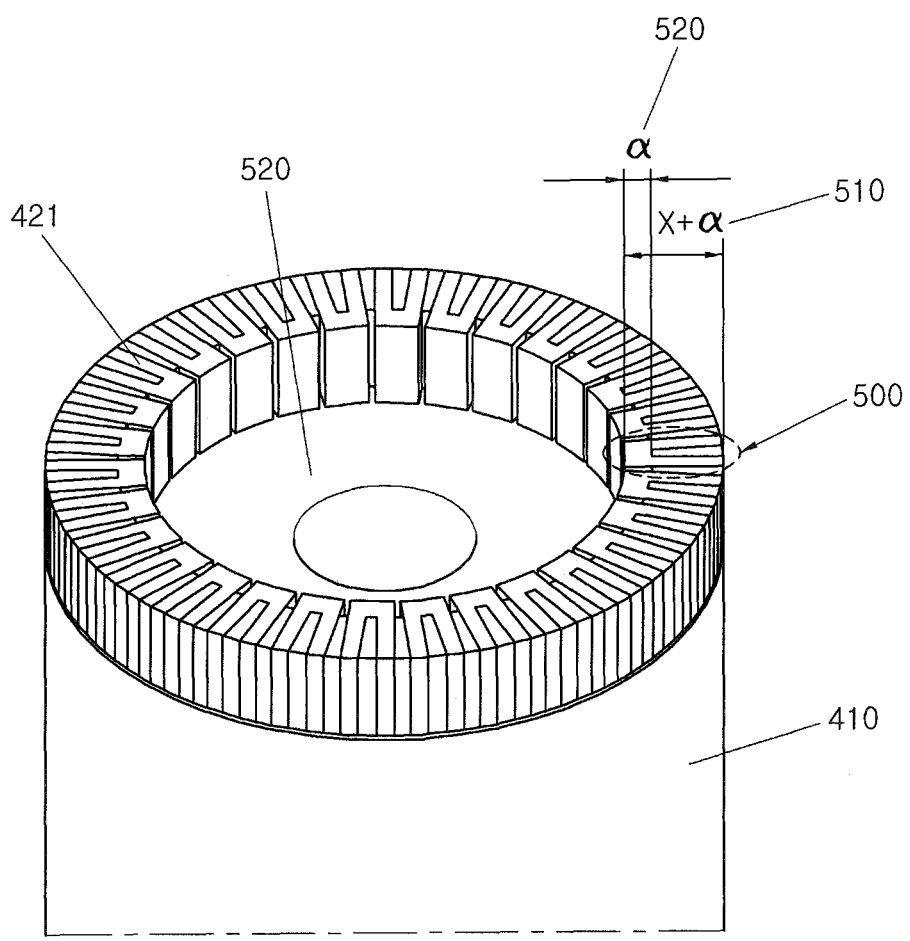
FIG. 5 is a diagram illustrating an area of the end-ring coupled with the rotor bar illustrated in FIG. 4.

FIG. 3 is a cross-sectional view taken along an X-X' axis illustrated in FIG. 2. Referring to FIG. 3, a "ㄷ"-shaped or "C"-shaped piece 210 is provided with an insertion groove 310 which is formed in an outside direction. Therefore, the insertion grooves 310 formed in the plurality of pieces 210 are coupled in the outside direction of the rotor from an inside direction thereof between the rotor bars, which is illustrated in FIG. 5. Matters of FIG. 5 will be described below.

Figure 4:
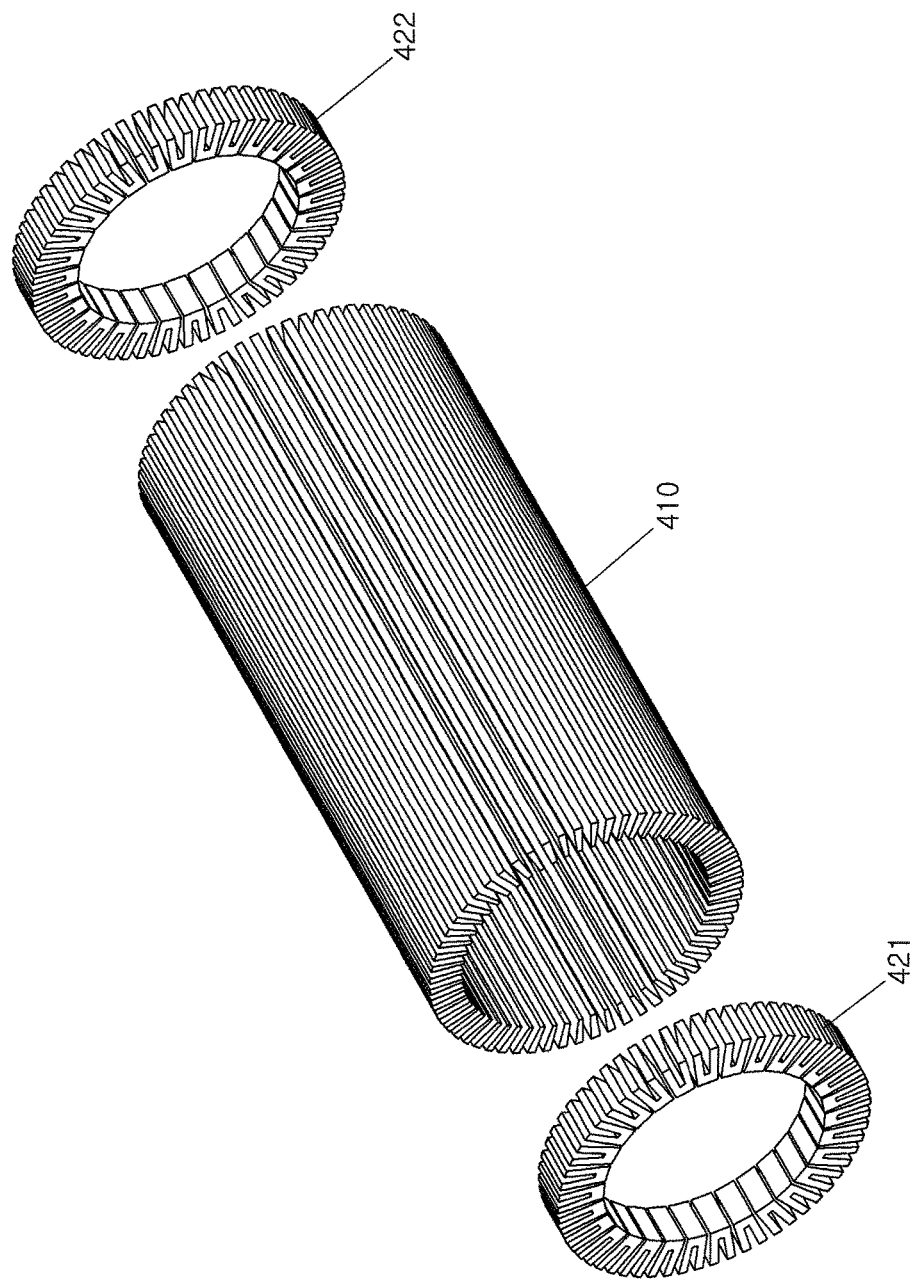
FIG. 4 is an assembled view of end-rings 421 and 422 in accordance with an embodiment of the present inventive concept with a rotor bar 410.

FIG. 4 is an assembled view of end-rings 421 and 422 in accordance with an exemplar embodiment of the present inventive concept with a rotor bar 410. Referring to FIG. 4, the end-ring 200 illustrated in FIGS. 2 and 3 which is configured in pair is coupled with upper and lower ends of the rotor bar 410. That is, the first end-ring 421 is coupled with a lower end of the rotor bar 410 and the second end-ring 422 is coupled with an upper end of the rotor bar 410. Further, the rotor bars 410 are also provided in plural, and as a material thereof, copper (Cu) is mainly used but is not limited thereto and therefore aluminum (Al) may be used.

Generally, the rotor (illustrated in FIG. 5 and described below) of the induction motor is largely configured of a rotor core (otherwise, called an electrical sheet), the rotor bar 410, and the end-rings 421 and 422.

Therefore, the rotor bar 410 is inserted in the rotor core and the "ㄷ"-shaped piece 210 is inserted between the rotor bars 410 from the inside of the rotor toward the outside thereof and then is brazed at the outside of the rotor, such that the rotor bar 410 is bonded to the end-rings 421 and 422.

Based on the foregoing scheme, when the copper rotor bar is applied to the upper and lower portions of the rotor by the same operation, the rotor of the induction motor may be manufactured. The rotor is shown in FIG. 5. In particular, FIG. 5 is a diagram illustrating the area of the end-ring coupled with the rotor bar illustrated in FIG. 4. FIG. 5 illustrates that a rotor core 520 is assembled in an inner surface of the rotor bar 410 and an end-ring width 500 is disposed on the end-ring 421 assembled at the upper end of the rotor bar 410. The end-ring width 500 becomes a sum of the width 520 of the rotor bar with the inside width 520 of the piece 210.

Like the rotor bar illustrated in FIG. 5, since the "ㄷ"-shaped pieces 210 requires only half the number of rotor bars 410, the operation time required to insert the pieces is reduced and thus productivity is improved.

Further, since the end-ring width 500 in which current flows is larger than the area of the rotor bar, a current density at the end-rings 421 and 422 may be reduced, thereby reducing the heat generation and improving the efficiency.

Figure 6:
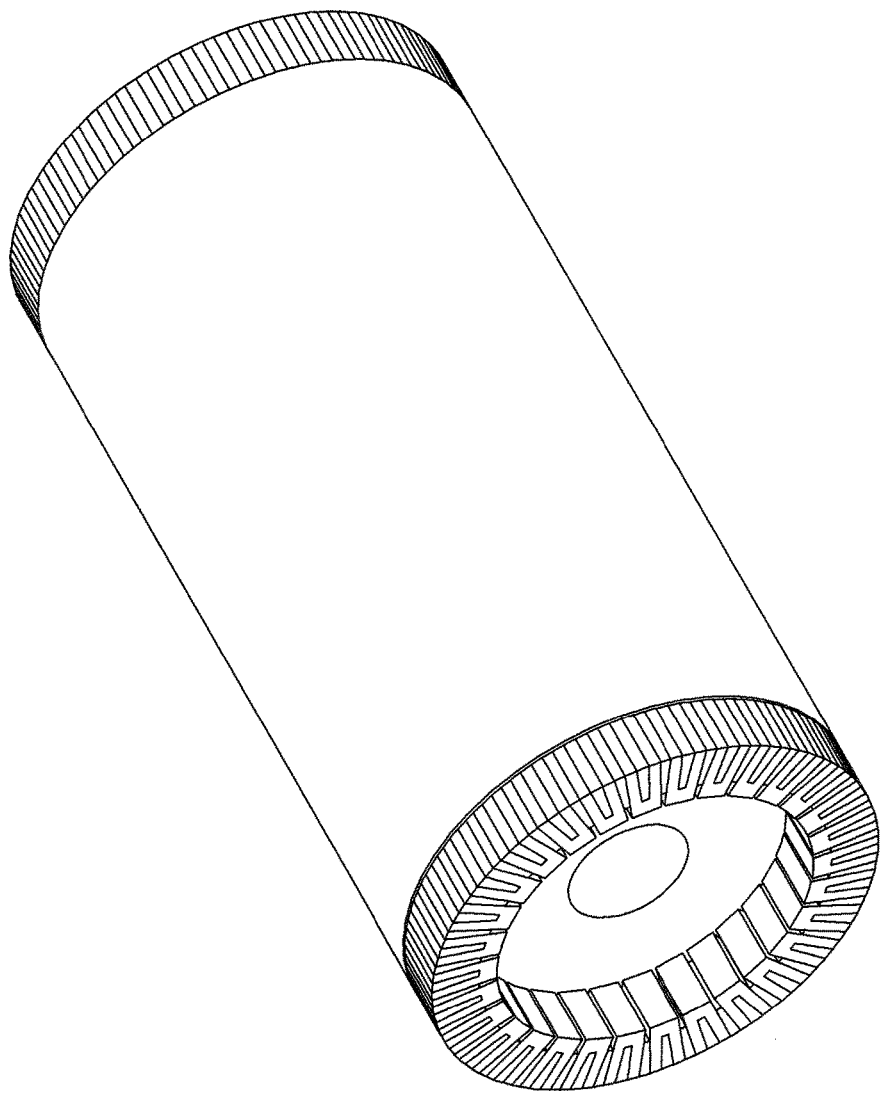
FIG. 6 is a perspective view of a rotor having the end-ring structure in accordance with an embodiment of the present inventive concept.

FIG. 6 is a perspective view of the rotor having the end-ring structure in accordance with the embodiment of the present inventive concept. When a phase balance current electrically having a phase difference of 120° is applied to a primary side stator (not illustrated) of the induction motor, a coil is wound around the stator with the phase difference of 120° and therefore a rotating magnetic field is generated.

Since the rotor bar cuts off a magnetic flux of the rotating magnetic field, that is, changes a magnetic flux of the rotating magnetic field, a voltage is induced and since the "⊏"-shaped piece configures a closed circuit, a current flows.

The rotor is applied with force by the current and the rotating magnetic field and thus rotates. Therefore, the rotor necessarily includes the "⊏"-shaped pieces configuring the closed circuit.

In accordance with the embodiments of the present inventive concept, since the area of the end-ring may be increased by configuring the end-ring in the "⊏"-shaped copper pieces, the secondary-side copper loss may be reduced and since the heat generation is reduced with the reduction in loss and thus the burden on the cooling system is reduced, the overall performance of the system may be improved.

Further, as another effect of the present inventive concept, since the copper pieces are inserted between the rotor bars and thus the number of copper pieces is required as many as the number of rotor bars, the process may be simple and the mass production time may be shortened.

In addition, as another effect of the present inventive concept, since the expensive star-like end-ring is not applied, the production cost may be reduced.

While the present inventive concept has been described with respect to the specific embodiments, it will be apparent to those skilled in the art that various changes and modifications may be made without departing from the spirit and scope of the invention as defined in the following claims.

What is claimed is:

1. A rotor comprising:
   a rotor core configured to rotate about a rotation axis and extending between a first end and a second end along an axial direction parallel to the rotation axis, the rotor core comprising a plurality of slots arranged in an angular direction about the rotation axis;
   a plurality of rotor bars, each of which is inserted in the plurality of slots, the plurality of rotor bars comprising a first rotor bar, a second rotor bar and a third rotor bar arranged in order along the angular direction such that the second rotor bar immediately neighbors the first rotor bar and the third rotor bar and is interposed between the first rotor bar and the third rotor bar when viewed in the axial direction, each of the plurality of rotor bars comprising a first end portion extending beyond the first end of the rotor core; and
   a plurality of single piece holders arranged along the angular direction and coupled to the first end portions of the plurality of rotor bars, the plurality of holder comprising a first holder and a second holder immediately neighboring the first holder along the angular direction;
   wherein, when viewed in the axial direction, each single piece holder comprises a base portion, a first branch protruding radially outward from the base portion, a second branch protruding radially outward from the base portion, and an insertion groove formed radially outside the base portion and between the first branch and the second branch, the insertion groove receiving the first end portion of one of the plurality of rotor bars,
   wherein, when viewed in the axial direction, the first rotor bar is received in the insertion groove of the first holder, the third rotor bar is received in the insertion groove of the second holder, the second rotor bar is positioned in a gap between the first holder and the second holder immediately neighboring the first holder.

2. The rotor of claim 1, wherein a material of the plurality of rotor bars is copper (Cu).

3. The rotor of claim 1, wherein a material of the plurality of rotor bars is aluminum (Al).

4. The rotor of claim 1, wherein the plurality of rotor bars and the plurality of holders are bonded to each other by brazing.

5. The rotor of claim 1, wherein, in a cross section taken perpendicular to the axis, the first end portion of each rotor bar has a trapezoidal shape.

6. The rotor of claim 1, wherein each of the plurality of holders is in a "C"-shape having its opening away from the rotation axis.

7. The rotor of claim 1, wherein the number of the plurality of holders is the half of the number of the plurality of rotor bars.

8. An induction motor comprising:
   the rotor of claim 1; and
   a stator configured to electromagnetically cooperate with the rotor to rotate the rotor.

\* \* \* \* \*